(12) United States Patent
Aloni et al.

(10) Patent No.: US 8,578,145 B2
(45) Date of Patent: *Nov. 5, 2013

(54) PORT THROTTLING ACROSS AN OPERATING SYSTEM RESTART DURING A HOT UPGRADE

(75) Inventors: Dan Aloni, Rishon Le-Zion (IL); Kanael Arditti, Tel Aviv (IL); Maor Ben-Dayan, Haifa (IL); Avner Braverman, Tel Aviv (IL); Haim Helman, San Jose, CA (US); Ben Reuveni, Caesarea (IL); Liran Zvibel, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 471 days.

This patent is subject to a terminal disclaimer.

(21) Appl. No.: 12/903,783

(22) Filed: Oct. 13, 2010

(65) Prior Publication Data

US 2012/0096250 A1    Apr. 19, 2012

(51) Int. Cl.
*G06F 9/24* (2006.01)

(52) U.S. Cl.
USPC .............................. 713/2; 717/168

(58) Field of Classification Search
USPC .............................. 713/2; 717/168
See application file for complete search history.

(56) References Cited

U.S. PATENT DOCUMENTS

| | | | |
|---|---|---|---|
| 5,701,429 A | 12/1997 | Legvold et al. | |
| 6,289,397 B1 | 9/2001 | Tsuyuguchi et al. | |
| 6,907,504 B2 | 6/2005 | Burton et al. | |
| 7,890,664 B1 * | 2/2011 | Tao et al. ........................ | 710/8 |
| 2004/0019752 A1 | 1/2004 | Burton et al. | |
| 2008/0155322 A1 | 6/2008 | Brundidge et al. | |
| 2008/0282239 A1 | 11/2008 | Borlick et al. | |

* cited by examiner

*Primary Examiner* — Albert Wang
(74) *Attorney, Agent, or Firm* — Griffiths & Seaton PLLC

(57) ABSTRACT

A processor, executing a first operating system kernel, tags a region of volatile memory used by a first storage area network (SAN) adapter driver coupled to a SAN adapter, and decouples the first SAN adapter driver from the SAN adapter. A boot of a second operating system kernel is then initiated while preserving in the tagged region of the volatile memory contents stored therein. After the boot, a second SAN adapter driver is then coupled to the SAN adapter.

15 Claims, 4 Drawing Sheets

PORT THROTTLING ACROSS AN OPERATING SYSTEM RESTART DURING A HOT UPGRADE

CROSS-REFERENCE TO RELATED APPLICATIONS

This application is related to U.S. patent applications entitled "Memory Tagging and Preservation During a Hot Upgrade" and "Preparing and Preserving a System Configuration During a Hot Upgrade" filed on even date with the present application, and which are incorporated herein by reference.

FIELD OF THE INVENTION

The present invention relates generally to a software upgrade for a computer appliance, and specifically to performing a hot upgrade across an operating system restart.

BACKGROUND OF THE INVENTION

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby preserving the contents stored in the volatile memory.

In addition to a warm boot and a cold boot, the Linux operating system offers a method of rapidly booting a new operating system kernel via the kexec function. The kexec function first loads a new kernel into memory and then immediately starts executing the new kernel.

SUMMARY OF THE INVENTION

An embodiment of the present invention provides a method, including tagging, by a processor executing a first operating system kernel, a region of a volatile memory used by a first storage area network (SAN) adapter driver coupled to a SAN adapter, decoupling the first SAN adapter driver from the SAN adapter, initiating a boot of a second operating system kernel while preserving in the tagged region of the volatile memory contents stored therein, and, after the boot, coupling a second SAN adapter driver to the SAN adapter.

There is also provided, in accordance with an embodiment of the present invention, an apparatus, including a volatile memory, and a processor configured to execute a first operating system kernel and tag a region of the volatile memory used by a first storage area network (SAN) adapter driver coupled to a SAN adapter, to decouple the first SAN adapter driver from the SAN adapter, to initiate a boot of a second operating system kernel while preserving in the tagged region of the volatile memory contents stored therein, and to couple, after the boot, a second SAN adapter driver to the SAN adapter.

There is further provided, in accordance with an embodiment of the present invention, a computer program product including a non-transitory computer readable storage medium having computer readable program code embodied therewith, the computer readable program code including computer readable program code configured to tag a region of a volatile memory used by a first storage area network (SAN) adapter driver coupled to a SAN adapter and executing over a first operating system kernel, computer readable program code configured to decouple the first SAN adapter driver from the SAN adapter, computer readable program code configured to initiate a boot of a second operating system kernel while preserving in the tagged region of the volatile memory contents stored therein, and computer readable program code configured to couple, after the boot, a second SAN adapter driver to the SAN adapter.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figures 1, 1A:
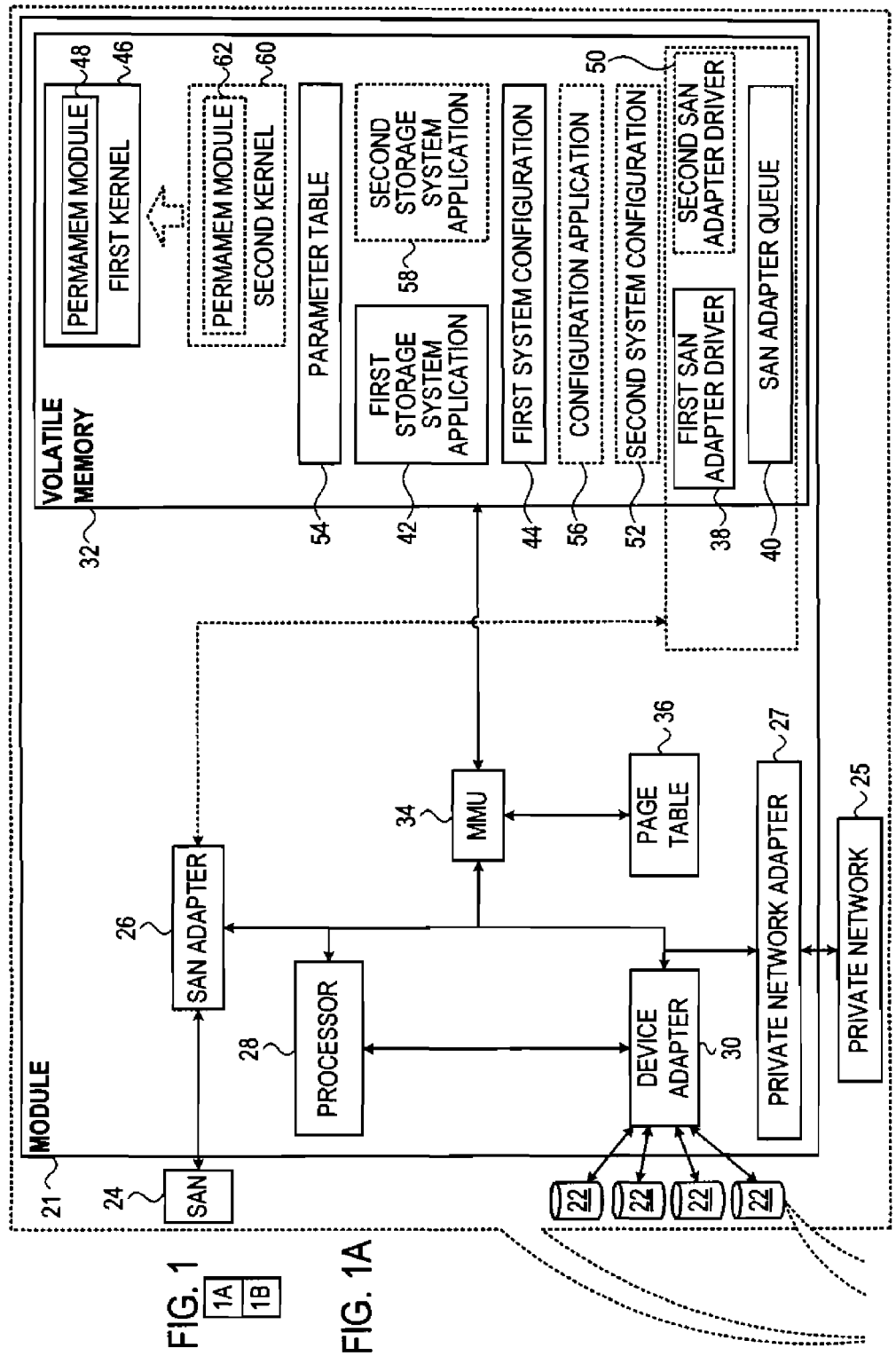
FIGS. 1A and 1B, referred to collectively as FIG. 1, are schematic pictorial illustrations of a clustered storage controller implementing port throttling, in accordance with an embodiment of the present invention.
Figure 1B:
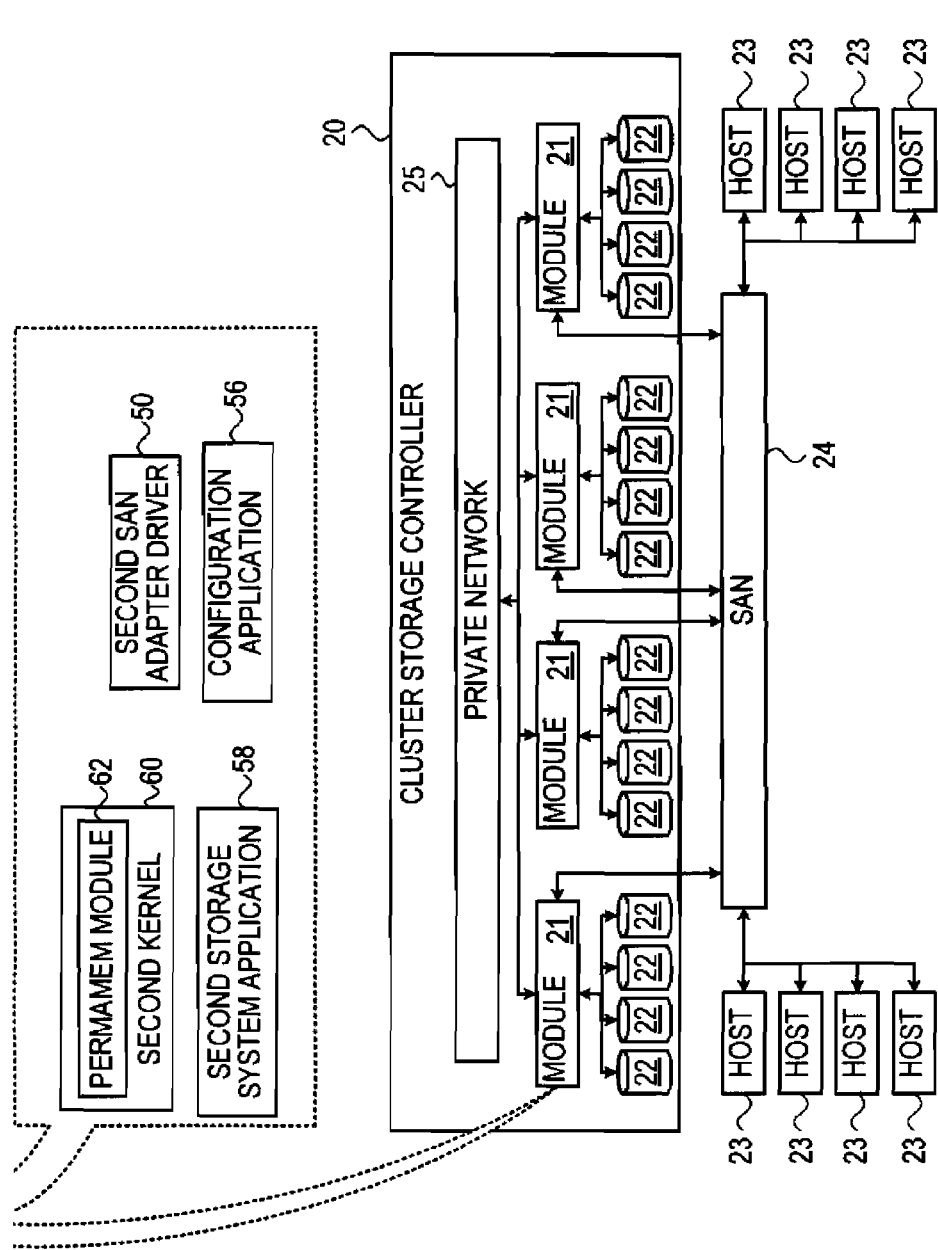

There may be instances when a storage controller administrator (i.e., an individual) needs to upgrade computer programs executing on the storage controller. Examples of computer programs executing on the storage controller include an operating system kernel (of an operating system such as Linux), a storage system application and a storage area network (SAN) adapter driver. The storage system application manages storage controller operations such as storage volume maintenance, thin provisioning and data replication (e.g., mirroring). The SAN adapter driver accepts a high-level command (e.g., a command to send data) from a computer program such as the storage system application, and translates the high-level command to a series of low-level commands specific to a SAN adapter. The SAN adapter is a hardware device that enables computer programs executing on the storage controller (e.g., the storage system application) to interact with host computers over a storage area network.

Computer programs such as the SAN adapter driver and the storage system application execute "on top" of the operating system kernel in the sense that the kernel provides a set of services and libraries for the computer programs to interact with the kernel, the storage controller hardware components (e.g., volatile memory and disk drives), as well as any other computer programs executing on the storage controller.

Given the variety of computer programs executing on a storage controller, it may be sometimes preferable to perform a hot upgrade (i.e., upgrading one or more computer programs executing on the storage controller while the storage controller is in operation)) for multiple computer programs simultaneously (e.g., upgrading the SAN adapter driver at the same time as upgrading the operating system kernel and the storage system application). Embodiments of the present invention provide methods and systems for performing a hot upgrade for a computer appliance, such as a storage controller, without interrupting in-flight I/O (input/output) operations. In some embodiments, while the storage controller is executing a first SAN adapter driver over a first operating system kernel, volatile memory regions used by the SAN adapter are reserved for future use by being "tagged," and the first SAN adapter driver is decoupled from the SAN adapter. Examples of tagged memory regions used by the SAN adapter include queues for processing I/O requests (also referred to herein as transactions) and direct memory access (DMA) regions for transferring data between the storage controller and other host computers on the SAN.

While the first SAN adapter driver is decoupled from the SAN adapter, the storage controller ignores existing I/O requests in the queues that have not yet started processing, as well as any additional incoming I/O requests. Embodiments of the present invention enable the upgrade of multiple computer programs on the storage controller before the non-processed and the incoming I/O requests generate a time out error. Host computers issuing I/O requests to the storage controller will simply experience a temporary slowdown in response from the storage controller. The temporary slowdown is herein also referred to as "port throttling."

After booting a second operating system kernel, the second kernel can load a second SAN adapter driver and restore addressability to the tagged volatile memory regions. Once addressability is restored to the tagged volatile memory regions and a second SAN adapter driver is coupled to the SAN adapter, the storage controller can then continue processing I/O requests.

The tagging and preservation of memory regions across system software upgrades is described in the U.S. patent application entitled "Memory Tagging and Preservation During a Software Upgrade" referenced above.

System Description

FIG. 1 is a schematic pictorial illustration of a clustered storage controller 20 implementing port throttling, in accordance with an embodiment of the present invention. In the implementation shown in the figures, clustered controller 20 comprises a plurality of generally similar modules 21. For simplicity, only one such module is shown in the figures. Modules 21 process I/O requests (i.e., commands to read or write data at logical addresses on logical volumes) from one or more host computers 23 coupled to a storage area network (SAN) 24. Each module 21 manages a number of storage devices 22, and is coupled to SAN 24 via a hardware SAN adapter 26. Examples of SAN adapters include Fibre Channel (FC) adapters and Internet Small Computer System Interface (iSCSI) adapters. Within clustered storage controller 20, each module 21 is also coupled to a private network 25 via a private network adapter 27. Private network 25 enables modules 21 in clustered storage controller 20 to communicate with one another.

While the description herein relates generally to a clustered storage controller, it will be understood that embodiments of the present invention may also be used for a non-clustered storage controller, and those having ordinary skill in the art will be able to adapt the description, mutatis mutandis, to apply to a non-clustered storage controller.

A processor 28 processes the I/O requests, transfers data from/to storage devices 22 via a device adapter 30, and conveys the result of the I/O requests (e.g., an acknowledgement of a write operation, or the retrieved data of a read operation) to host computers 23 on SAN 24 via SAN adapter 26. Examples of device adapters include International Business Machines (IBM) ServeRAID™ M5000 series adapters, which implement both Serial Advance Technology Attachment (SATA) and Serial Attached SCSI (SAS) computer bus interfaces. Storage devices 22 typically comprise a combination of high capacity hard disk drives and solid state disk drives.

Processor 28 typically comprises a general-purpose computer configured to carry out the functions described herein. Software operated by the processor may be downloaded to a volatile memory 32 in electronic form, over a network, for example, or it may be provided on non-transitory tangible media, such as optical, magnetic or electronic memory media. Alternatively, some or all of the functions of processor 28 may be carried out by dedicated or programmable digital hardware components, or by using a combination of hardware and software elements.

SAN adapter 26, private network adapter 27, processor 28 and device adapter 30 access volatile memory 32 via a memory management unit (MMU) 34, which performs virtual memory management by translating virtual addresses to their corresponding physical addresses in volatile memory 32. The mapping relationship between the physical addresses and the virtual addresses is stored in a page table 36. In addition to mapping virtual addresses to their corresponding physical addresses, page table 36 enables MMU 34 to present a combination of non-contiguous regions in volatile memory 32 as a single contiguous virtual memory region.

Initially, processor 28 executes a first SAN adapter driver 38 which accesses a SAN adapter queue 40, and a first storage system application 42 which accesses a first system configuration 44. SAN adapter queue 40 is a First-In-First-Out (FIFO) data structure in volatile memory 32. Although the configuration in the figures includes a single SAN adapter queue (i.e., adapter queue 40), a typical implementation includes multiple SAN adapter queues, where each of the multiple SAN adapter queues is allocated to one of host computers 23

First SAN adapter driver 38 uses SAN adapter queue 40 to store I/O requests ensuring that the I/O requests are processed in the order they were received. As discussed supra, first storage system application 42 manages operations such as storage volume maintenance, thin provisioning and data replication.

First system configuration 44 stores information about the storage controller and the first storage system application. Examples of information stored in the first system configuration for clustered storage controller 20 include (a) the number of hard disks, (b) the serial numbers of the hard disks, (c) the number of processors installed in clustered storage controller 20, (d) the number of active volumes, (e) type and size of each volume, (f) the number of cables, (g) the state of each cable, and (h) the number of stored snapshots.

First SAN adapter driver 38 and first storage system application 42 execute on top of a first operating system kernel 46 stored in a particular address in volatile memory 32. First operating system kernel 46 comprises a permamem module 48 (a software module) configured to identify sets of parameters referencing SAN adapter queue 40 and a second system configuration 52, and to store the sets of parameters to a parameter table 54.

Second system configuration 52 is created by a configuration application 56. Second system configuration 52 is used by a second storage system application 58, typically an upgraded version of first software system application 42, which executes on top of a second operating system kernel 60 after the hot upgrade.

Prior to booting second operating system kernel 60, processor 28 overwrites first operating system kernel 46 with the second kernel, so that the second kernel is now stored at the particular address in memory 32 which previously stored the first kernel. Second operating system kernel 60 comprises a permamem module 62 configured to retrieve the sets of parameters stored in parameter table 54, enabling a second SAN adapter driver 50 to address SAN adapter queue 40, and to enable second storage application 58 to address second system configuration 56. Permamem modules 48, 62 and parameter table 54 are described in more detail in U.S. patent application "Memory Tagging and Preservation During a Software Upgrade" referenced above.

While the configuration of storage devices 22 shown in FIG. 1 shows the one of the storage devices 22 storing second kernel 60, second storage system application 58, second SAN adapter driver 50 and configuration application 56 (i.e., the computer programs and the configuration executed by storage controller 20 after the hot upgrade), the storage devices typically store many additional computer programs and data files used by the modules of the storage controller.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Hot Upgrade with Port Throttling

Figure 2:
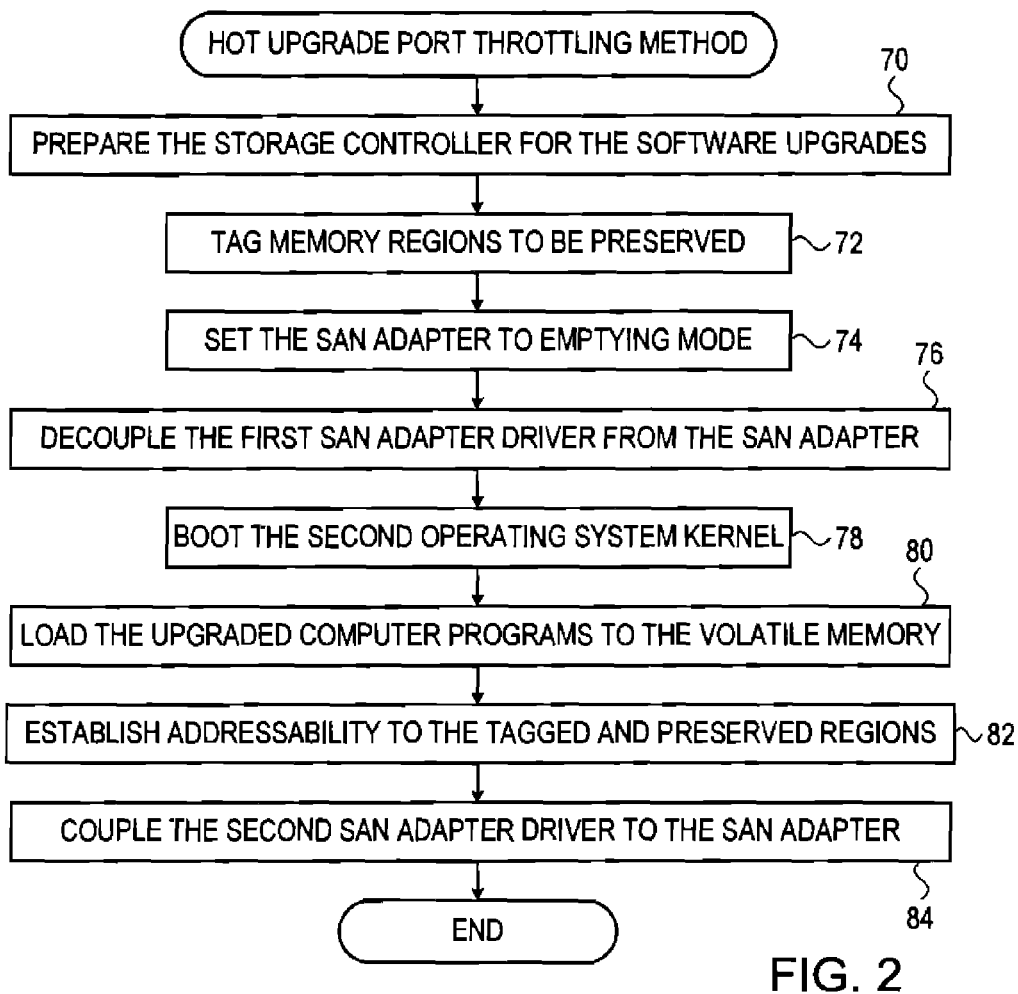
FIG. 2 is a flow diagram that schematically illustrates a hot upgrade method using port throttling, in accordance with an embodiment of the present invention.

FIG. 2 is a flow diagram that schematically illustrates a method of performing a hot upgrade using port throttling, in accordance with an embodiment of the present invention. Prior to performing the hot upgrade, processor 28 is executing first SAN adapter driver 38 and first storage system application 42, which is using first system configuration 44. First SAN adapter driver 38 and first storage system application 42 are both executing on top of first operating system kernel 46.

In a preparation step 70, processor 28 prepares clustered storage controller 20 for upgraded versions of the computer programs currently executing on the storage controller. Processor 28 typically receives second operating system kernel 60, second storage application 58, configuration application 56 and second SAN adapter driver 50 (collectively known herein as the "upgraded computer programs") from the Internet (not shown) and stores the upgraded computer programs to storage device 22.

During the preparation step, processor 28 executes configuration application 56 to create second system configuration 52, which will be used by second storage application 58 after the hot upgrade. A configuration application and a system configuration, corresponding respectively to configuration application 56 and second system configuration 52 are described in more detail in U.S. patent application "Preparing and Preserving a System Configuration During a Software Upgrade", referenced above.

In a tag step 72, processor 28 tags regions in volatile memory 32 storing SAN adapter queue 40 and second system configuration 52, ensuring that the tagged regions are preserved during the hot upgrade. When tagging memory regions for SAN adapter queue 40, processor 28 first identifies a virtual memory address for the SAN adapter queue, and then (via MMU 34 and page table 36) identifies a physical memory address in memory 32 associated with the SAN adapter queue.

After identifying the physical memory addresses for SAN adapter queue 40, processor 28 stores a set of parameters for the SAN adapter queue to an entry in parameter table 54. The set of parameters references the SAN adapter queue, and comprises elements which includes information such as (a) a name identifying the memory region storing SAN adapter queue 40, (b) a size (i.e., the number of bytes), (c) a virtual memory address, (d) a physical memory address, and (e) a memory type, indicating whether the tagged memory region is restricted to a kernel space comprising memory regions reserved for kernel 46 and kernel 60 or to a user space e.g., memory regions for SAN adapter queue 40, that are used by user applications. Since SAN adapter queue 40 may include more than one physical memory region, the set of parameters stored in parameter table 54 may include additional parameters for the physical memory address of each additional physical memory region of the SAN adapter queue.

Additional regions that are used by SAN adapter 26 may also be tagged and preserved, such as second system configuration 52, a cache, or transaction states. Tagging regions is described in more detail in U.S. patent application "Memory Tagging and Preservation During a Hot Upgrade" referenced above.

In an emptying step 74, processor 28 then places SAN adapter 26 in an "emptying" mode. During the emptying mode, the SAN adapter allows transactions (i.e., I/O requests) currently being processed by processor 28 to complete, while ignoring requests still in SAN adapter queue 40 which have not begun to be processed. Since the SAN adapter is ignoring pending transactions in SAN adapter queue 40, the SAN adapter queue will rapidly fill up with transaction requests. When the SAN adapter queue fills up, processor 28 responds to additional transaction requests with a TASK_SET_FULL message (i.e., a "busy signal") to host computers issuing the additional transaction requests.

After tagging the memory regions for SAN adapter queue 40, processor 28, in a decouple step 76, decouples first SAN adapter driver 38 from SAN adapter 26 by setting a SAN adapter status flag to decoupled, thereby instructing the first SAN adapter driver to decouple from the SAN adapter. Upon detecting that the SAN adapter status flag is set to decoupled, the first SAN adapter driver is configured to ignore any hardware requests and interrupts. Depending on how SAN adapter 26 and first SAN adapter driver 38 are configured, the first SAN adapter driver detects when the SAN adapter status flag is set to decoupled by either handling an interrupt or polling the SAN adapter status flag.

Processor 28 also serializes (i.e., stores in a manner that the second SAN adapter driver can retrieve) information to be used by the second adapter driver. Serialized information includes login information for host computers 23 currently communicating with SAN adapter 26.

In a boot step 78, processor 28 calls the kexec function which first overwrites first operating system kernel 46 with second operating system kernel 60 and then starts executing (i.e., boots) the second operating system kernel. Since power is applied to volatile memory 32 while starting the second operating system kernel, contents stored in the volatile memory, including the parameter table and the tagged memory regions, are preserved during the transition from first kernel 44 to second kernel 60. While the example described herein uses the kexec function to rapidly boot the second operating system kernel, embodiments of the present invention may use other methods of rapidly booting the second operating system kernel, as are known in the art.

After processor 28 starts executing second operating system kernel 60, in a load step 80, processor 28 loads second SAN adapter driver 50 and second storage system application 58 (i.e., the upgraded computer programs) from storage device 22 to volatile memory 32.

In an establish addressability step 82, second storage system application 58 establishes addressability to any associated tagged memory regions, such as second system configuration 52. To establish addressability, second storage system application 58 determines that it was started after a hot upgrade, and then retrieves, via functions in permamem module 62, the set of parameters associated with second system configuration 52 from parameter table 54. Second storage system application 58 can then access and update second system configuration 52.

Finally, in a recouple step 84 (i.e., after booting the second operating system kernel), processor 28 couples second SAN adapter driver 50 to SAN adapter 26 by bringing up (i.e., activating) the second SAN adapter driver. In a manner similar to establishing addressability for second storage system application 58, second SAN adapter driver 50 determines that it was started after a hot upgrade, and establishes addressability to SAN adapter queue 40 by retrieving the set of parameters associated with SAN adapter queue 40 from parameter table 54. To complete the recouple step, processor 28 then resets the SAN adapter status flag back to coupled, thereby instructing the second SAN adapter driver to couple to the SAN adapter.

Upon detecting the SAN adapter status flag set to coupled (e.g., by polling the SAN adapter status flag), second SAN adapter driver 50 is configured to handle any queued hardware requests and interrupts. Second adapter driver 50 then uses the previously serialized information to simulate one or more logins with host computers 23, thereby continuing the handshaking that existed prior to step 74 with the host computers. Simulating the logins ensures that the host computers maintain communication with storage controller 20 throughout the hot upgrade.

Once second SAN adapter driver 50 is coupled to SAN adapter 26, processor 28, executing second storage system application 58 over second operating system kernel 60, starts processing transactions in SAN adapter queue 40 (i.e., the second storage application uses the tagged memory region referencing the SAN adapter queue).

Embodiments of the present invention operating ensure that steps 74 to 84 of the hot upgrade method shown in FIG. 2 is completed before any of the host computers receive time out errors for transaction requests that are not being processed while SAN adapter 26 is not coupled to either of the SAN adapter drivers. To optimize kernel boot step 78, the inventors have further reduced the time required to boot the second operating system kernel via kexec (i.e., when running Linux) by:

Removing a BogoMips calculation while booting the second operating system kernel. The BogoMips calculation calculates the processor speed during a typical Linux boot.

Removing a Complementary Metal Oxide Semiconductor (CMOS) time synchronization procedure while booting the second operating system kernel. The CMOS time synchronization procedure typically adds up to one second while booting a Linux kernel.

Bypassing all diagnostic probes for hardware components (e.g., processor 28, memory 32, SAN adapter 26 and device adapter 30) while booting the second operating system kernel.

Embodiments of the present invention successfully perform the hot upgrade described herein when the time required to perform the hot upgrade is less than a time out period (i.e., for generating a time out error) for an I/O protocol being used by storage controller 20. For example, the inventors have successfully implemented the hot upgrade described herein in under 10 seconds for an International Business Machines (IBM) XIV Storage System Model 2810 (i.e., a storage controller), using Fibre Channel or iSCSI I/O protocols which have time out periods of 20 seconds.

Figure 3:
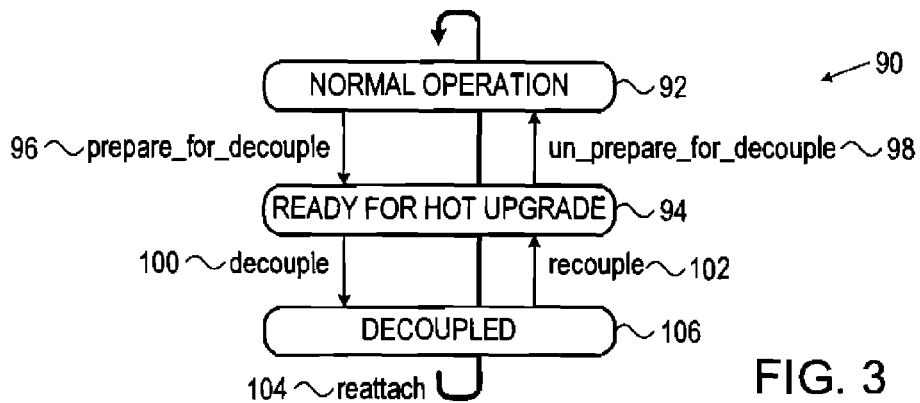
FIG. 3 is a state diagram that schematically illustrates states of a storage controller implementing a hot upgrade using port throttling, in accordance with an embodiment of the present invention.

FIG. 3 is a state diagram 90 that schematically illustrates the states of storage controller 20, in accordance with an embodiment of the present invention. While in a normal operation state 92 and a ready for hot upgrade state 94, processor 28 immediately processes I/O requests received via SAN adapter 26. During a prepare_for_decouple transition condition 96 (i.e., from normal operation state 92 to ready for hot upgrade state 94), processor 28 shuts down all services which are not necessary for performing I/O operations (i.e., not affecting I/O operations).

The hot upgrade described in the flow diagram in FIG. 2 typically upgrades multiple computer programs (e.g., first operating system kernel 42, first SAN adapter driver 38 and first storage system application 42). To minimize the time during which I/O requests are not processed, it is desirable for all computer programs being upgraded to reach step 76 at approximately the same time. If any of the computer programs to be upgraded fails to prepare for the upgrade, then processor 28 uses an un_prepare_for_decouple transition condition 98 to return to normal operation state 92, and restores the computer programs that succeeded in preparing for the hot upgrade back to their original (i.e., non-upgraded) states. Processor 28 may repeat transition condition 96 several times until all the computer programs successfully reach ready for hot upgrade state 94.

When all the computer programs targeted for upgrade reach ready for hot upgrade state 94, processor 28 can then perform a decouple transition condition 100 on all of the targeted computer programs simultaneously. Decouple transition condition 100 erects an I/O "barrier," preventing processor 28 from processing any further I/O requests (i.e., after completing step 74). Once processor 28 starts decouple transition condition 100, the "clock starts ticking" on the hot upgrade completing prior to the host computers receiving time out errors on their submitted transactions. During decouple transition condition 100, new transaction requests are queued in SAN adapter queue 40 (which is tagged and preserved) for processing once the hot upgrade method described in the flow diagram of FIG. 2 is completed.

While processor 28 is queuing new requests (i.e., as long as there is still room in SAN adapter queue 40), the processor may still be processing the I/O requests that were active prior to decouple transition condition 100. If the active I/O requests complete within a certain time out period (typically one to three seconds), then processor 28 transitions to a decoupled state 106 via decouple transition condition 100. If, however, the active I/O requests are not completed within the certain time out period, then processor 28 transitions back to ready for hot upgrade state 94 via a recouple transition condition 102. Processor 28 may try to decouple first SAN adapter driver 38 from SAN adapter 26 more than once until all I/O requests are successfully cleared within the time out period, or until the processor gives up and reverts back to normal operation state 92, without notifying the administrator.

While in decoupled state 106 (but prior to booting the second operating system kernel and loading the upgraded computer programs), first SAN adapter driver 38 receives a final notification immediately before the first operating system kernel is replaced in step 78. Upon receiving the final notification, the first SAN adapter driver stops all communications with transport firmwares (like interrupts and watchdogs) and serializes any last minute updates on generic SCSI or transport specific information that need to be transferred to the second SAN adapter driver. All serialized information is stored tagged and preserved in volatile memory 32 using methods described hereinabove. Processor 28 can then boot the second operating system kernel and load the upgraded computer programs to volatile memory 32, as described in steps 78, 80 and 82, respectively.

After booting the second operating system kernel and loading the upgraded computer programs (and while still in decoupled state 106), second SAN adapter driver 50 determines that it started after a hot upgrade. Therefore, instead of initializing normally, processor 28, executing second SAN adapter driver 50, performs a reattach transition condition 104 (i.e., during recouple step 84) to transition back to normal operation state 92. While second SAN adapter driver 50 initializes all internal data structures for the SAN adapter, during reattach transition condition 104, the second SAN adapter driver uses the information serialized from the first SAN adapter driver (e.g. host login information) to initialize the system state. Additionally, processor 28 restores addressability of second SAN adapter driver 50 to SAN adapter queue 40 (and any other regions in volatile memory 32 that were previously used by the first SAN adapter driver) instead of allocating and initializing a new queue.

When processor 28 couples second SAN adapter driver 50 to SAN adapter 26, the state diagram transitions to normal operation 92 via a reattach transition condition 104. Processor 28 can then process the I/O requests which were queued while in decoupled state 106.

Figure 4:
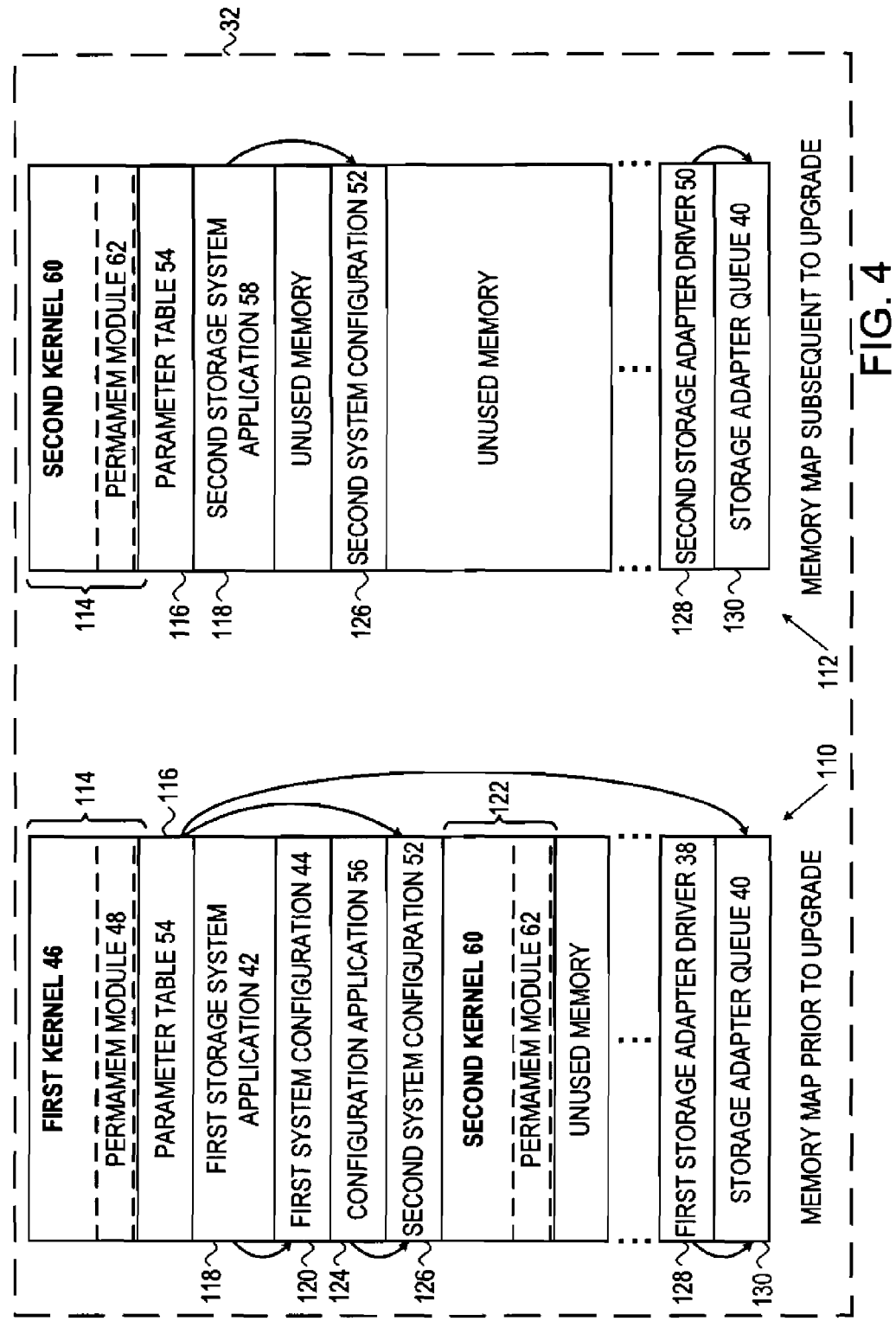
FIG. 4 is a block diagram that schematically illustrates memory maps of a volatile memory of a storage controller implementing a hot upgrade using port throttling, in accordance with an embodiment of the present invention.

FIG. 4 is a block diagram that schematically illustrates a memory map 110 of volatile memory 32 prior to step 78 of the flow diagram of FIG. 2, and a memory map 112 of the volatile memory upon completing the process of the flow diagram. Prior to step 78, processor 28 is executing a first kernel 46, including permamem module 48, which are stored in a memory region 114. In addition to first kernel 46, processor 28 is also executing (i.e., prior to step 78) first storage system application 42, which is stored in a memory region 118. In operation, first storage system application 42 accesses first system configuration 44, which is stored in a memory region 120.

A second operating system kernel 60, including permamem module 62 is loaded to a memory region 122 during step 70. Configuration application 56, is stored in a memory region 124, and is configured to create second system configuration 52 which is stored in a memory region 126. Additionally, first SAN adapter driver 38 is stored in a memory region 128 and is configured to access SAN adapter queue 40, which is stored in a memory region 130. During step 72, processor 28 stores entries in parameter table 54 stored in a memory region 116, comprising a pointer to memory region 126 and a pointer to memory region 130.

In step 78, prior to starting second operating system kernel 60 via the kexec function, processor 28 overwrites first kernel 46 in memory region 114 with second operating system kernel 60. During step 80, processor 28 loads second storage system application 58 to memory region 118 and second SAN adapter driver 50 to memory region 130. Alternatively, the second storage system application and the second SAN adapter driver can be loaded to any unused region of volatile memory 32. After enabling second storage application 58 to address second system configuration 52 and second SAN adapter driver 50 to address SAN adapter queue 40, processor 28 can then proceed to process I/O any requests in the SAN adapter queue.

The following are examples of functions that can be included in the first SAN adapter driver and the second SAN adapter driver to decouple first SAN adapter driver 38 from SAN adapter 26 and to couple second SAN adapter driver 50 to the SAN adapter, in accordance with an embodiment of the present invention:

int prepare_for_hot_upgrade(void). During step 74, processor 28 calls prepare_for_hot_upgrade to place SAN adapter 26 in emptying mode.

int un_prepare_for_hot_upgrade(void). If at any point the hot upgrade (described in the flow diagram in FIG. 2) fails prior to completion, processor 20 calls un_prepare_for_hot_upgrade to instruct SAN adapter 26 to start processing I/O requests in SAN adapter queue 40.

int decouple(void). During step 76, processor 28 calls decouple to decouple first SAN adapter driver 38 from SAN adapter 26.

int recouple(void). During step 84, processor 28 calls recouple to couple second SAN adapter driver 50 to SAN adapter 26, or to recouple first SAN adapter driver 38 if the hot upgrade fails.

In addition to software function calls, the SAN adapter drivers implementing embodiments of the present invention support processor 28 tagging and preserving all memory regions (i.e., buffers) referenced by SAN adapter 26. These buffers include all buffers which the SAN adapter can access for reading or writing outside the context of a specific command processing. Therefore, the SAN adapter can continue to operate during and after the hot upgrade without the need to reload any host side buffers.

Additionally, the tagging and preserving of SAN adapter queue 40 enables processor 28 to continue transferring (i.e., using DMA) new commands (e.g., transaction requests) to the SAN adapter queue in volatile memory 32 throughout the hot upgrade. Other memory regions that are used to communicate with the SAN adapter on a command specific basis, such as buffers referenced in scatter-gather lists for data transfer, do not have to be tagged and preserved during the hot upgrade. Furthermore, processor 28 can serialize, tag and preserve information that reflects the state of the SAN adapter in order to allow the second SAN adapter driver to use the preserved information. As discussed supra, the serialized information can be used by second SAN adapter driver 50 to simulate logins with host computers 23 that first SAN adapter driver 38 was communicating with prior to the hot upgrade.

In addition to the SAN adapter driver function calls discussed supra, additional capabilities can be added to the SAN adapter's firmware to implement embodiments of the present invention. The additional capabilities include keeping a physical link between SAN adapter 26 and a host computer 23 while the SAN adapter driver is decoupled from first SAN adapter, and before the SAN adapter driver is coupled to the SAN adapter. For example, the firmware can be adapted to keep a Fibre Channel adapter's laser light active even while the driver is decoupled Adaptations to firmware for SAN adapters supporting a reliable media (e.g., Fibre Channel adapters) include:

Continue DMA operations without a driver. The firmware continues DMA transfers to volatile memory 32 on previously posted buffers without SAN adapter driver intervention or acknowledgement.

Retain interrupts. The firmware retains interrupt codes for all DMA buffers for as many buffers as can be posted to the firmware. Retaining interrupt codes enables the second SAN adapter driver to ascertain which DMA operations completed when interrupts were disabled while booting the second operating system kernel via kexec and while initializing the second SAN adapter driver.

Independence. The firmware operates independently for a specific time period (e.g., 15 seconds) without SAN adapter driver intervention. Therefore the first and the second storage system applications are able to disable all watchdogs and other mechanisms that require intervention from the currently active SAN adapter driver.

Discard commands. If the SAN adapter runs out of posted command buffers (i.e., entries in SAN adapter queue 40) while the first SAN adapter driver is decoupled during the hot upgrade (i.e., after processor 28 disconnects the first SAN adapter driver from the SAN adapter, but before the processor restores addressability to the tagged and preserved regions in memory 32) processor 28 ignores all new transactions. Ignoring transactions prompts host computers on SAN 24 to retry sending these transactions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
a volatile memory; and
a processor configured to execute a first operating system kernel and tag a region of the volatile memory used by a first storage area network (SAN) adapter driver coupled to a SAN adapter, the first SAN adapter embedded in the first operating system kernel or in a userspace outside the first operating system kernel, to decouple the first SAN adapter driver from the SAN adapter, to initiate a boot of a second operating system kernel while preserving in the tagged region of the volatile memory contents stored therein, and to couple, after the boot, a second SAN adapter driver to the SAN adapter.

2. The apparatus according to claim 1, wherein the processor is configured to initiate the boot by performing a hot upgrade of a computer appliance.

3. The apparatus according to claim 2, wherein the computer appliance comprises a storage controller.

4. The apparatus according to claim 1, wherein the tagged region comprises a SAN adapter queue storing a plurality of transactions to be processed by the SAN adapter.

5. The apparatus according to claim 1, wherein the processor is configured, at a time prior to tagging the region, to store the second SAN adapter driver and the second operating system kernel to a storage device coupled to the processor.

6. The apparatus according to claim 5, wherein the processor is configured to store the first operating system kernel at a first address in the volatile memory, and wherein the processor is further configured to initiate the boot of the second operating system kernel by loading the second operating system kernel from the storage device to a second address in the volatile memory, copying the second operating system kernel from the second address to the first address, and starting the second operating system kernel.

7. The apparatus according to claim 1, wherein the processor is configured to tag the region by storing, to a parameter table in the volatile memory, a set of parameters referencing the tagged region.

8. The apparatus according to claim 7, wherein the processor is configured to select each of the parameters from a group consisting of a name, a size, a virtual memory address, a physical memory address and a memory type.

9. The apparatus according to claim 7, wherein the processor is configured to decouple the first SAN adapter driver by setting a flag, thereby instructing the first SAN adapter driver to ignore interrupts and hardware requests, and serializing login information for one or more host computers communicating with the SAN adapter via a storage area network.

10. The apparatus according to claim 7, wherein the processor is configured to couple the second adapter driver by retrieving the set of parameters indicating the tagged memory region, resetting the flag, thereby instructing the second SAN adapter driver to process the interrupts and the hardware requests, simulating one or more logins, by the second adapter driver using the serialized login information, with the one or more host computers, and establishing addressability, by the second SAN adapter driver, to the tagged memory region.

11. A computer program product, the computer program product comprising:
a non-transitory computer readable storage medium having computer readable program code embodied therewith, the computer readable program code comprising:
computer readable program code configured to tag a region of a volatile memory used by a first storage area network (SAN) adapter driver coupled to a SAN adapter and executing over a first operating system kernel, the first SAN adapter embedded in the first operating system kernel or in a userspace outside the first operating system kernel;
computer readable program code configured to decouple the first SAN adapter driver from the SAN adapter;
computer readable program code configured to initiate a boot of a second operating system kernel while preserving in the tagged region of the volatile memory contents stored therein; and
computer readable program code configured to couple, after the boot, a second SAN adapter driver to the SAN adapter.

12. The computer program product according to claim 11, wherein the tagged region comprises a SAN adapter queue storing a plurality of transactions to be processed by the SAN adapter.

13. The computer program product according to claim 11, wherein the computer readable program code is configured to tag the region by storing, to a parameter table in the volatile memory, a set of parameters referencing the tagged region.

14. The computer program product according to claim 13, wherein the computer readable program code is configured to decouple the first SAN adapter driver by setting a flag, thereby instructing the first SAN adapter driver to ignore interrupts and hardware requests, and serializing login information for one or more host computers communicating with the SAN adapter via a storage area network.

15. The computer program product according to claim 13, wherein the computer readable program code is configured to couple the second adapter driver by retrieving the set of parameters indicating the tagged memory region, resetting the flag, thereby instructing the second SAN adapter driver to process the interrupts and the hardware requests, simulating one or more logins, by the second adapter driver using the serialized login information, with the one or more host computers, and establishing addressability, by the second SAN adapter driver, to the tagged memory region.

\* \* \* \* \*